United States Patent
Nakashima et al.

(10) Patent No.: US 6,778,215 B1
(45) Date of Patent: Aug. 17, 2004

(54) DRIVING METHOD OF SOLID-STATE IMAGE PICKUP DEVICE AND IMAGE PICKUP SYSTEM

(75) Inventors: Kazutoshi Nakashima, Kagoshima (JP); Hiroaki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 328 days.

(21) Appl. No.: 09/656,970

(22) Filed: Sep. 7, 2000

(30) Foreign Application Priority Data

Sep. 8, 1999  (JP) ............................................. 11-253768
Oct. 29, 1999 (JP) ............................................. 11-308311

(51) Int. Cl.[7] .............................................. H04N 5/335
(52) U.S. Cl. ........................ 348/314; 348/298; 348/312; 348/320; 348/250
(58) Field of Search ................................ 348/294, 302, 348/312, 314, 308, 305, 317

(56) References Cited

U.S. PATENT DOCUMENTS 5,142,136 A * 8/1992 Hasegawa et al. ........ 250/208.1
5,434,437 A * 7/1995 Itakura et al. ............... 257/231
5,450,129 A * 9/1995 Matoba et al. .............. 348/294
5,491,512 A * 2/1996 Itakura et al. ............... 348/321
5,828,407 A * 10/1998 Suzuki ........................ 348/312
6,157,406 A * 12/2000 Iura et al. ................. 348/220.1
6,480,226 B1 * 11/2002 Takahashi et al. ........... 348/296
6,559,889 B2 * 5/2003 Tanaka et al. ............... 348/299
6,700,610 B1 * 3/2004 Kijima et al. ................ 348/296

* cited by examiner

Primary Examiner—Ngoc-Yen Vu
Assistant Examiner—Rashawn N. Tillery
(74) Attorney, Agent, or Firm—Frommer Lawrence & Haug LLP; William S. Frommer

(57) ABSTRACT

Defective sweep occurs when strong light enters, i.e., a quantity of input light increases, and smear and blooming components increase during an exposure period because a quantity of unnecessary charge to be swept during a sweep-out transfer period of a first field side exceeds a quantity of charge to be handled. The inventive image pickup system solves the above-mentioned problem by setting the sweep-out transfer period of the first field side to be longer than the sweep-out transfer period of a second field in a digital still camera which controls an exposure time by using a mechanical shutter in using as an image pickup device, a solid-state image pickup device which carries out the sweep-out transfer of transferring and sweeping charges within a vertical transfer section quickly more than transfer speed in transferring the signal charges read out from a sensor section to the vertical transfer section before reading out the signal charges from the sensor section to the vertical transfer section.

6 Claims, 10 Drawing Sheets

DRIVING METHOD OF SOLID-STATE IMAGE PICKUP DEVICE AND IMAGE PICKUP SYSTEM

BACKGROUND OF THE INVENTION

1. Field of the Invention

The present invention relates to a method for driving solid-state image pickup devices and an image pickup system and more specifically to a method for driving interlace scanning type solid-state image pickup devices and an image pickup system carrying the solid-state image pickup devices to which such driving method is applied as image pickup devices and controlling an exposure time by using light control means such as a mechanical shutter.

2. Related Art Statement

Digital still cameras (electronic still cameras) are now rapidly disseminating as an image pickup system using solid-state image pickup devices as image pickup devices. The digital still camera uses a so-called total pixel reading out type solid-state image pickup device which reads out signal charges of all pixels simultaneously and transfers the signal charges of the respective pixels independently or a so-called frame reading out type solid-state image pickup device which reads out signal charges of odd and even lines alternately per field and transfers the signal charges of the respective pixels independently is used to give priority to the resolution in taking a still picture.

Signals of two fields are required to obtain one frame of picture when the frame reading out type solid-state image pickup device is used among such reading out type solid-state image pickup devices as the image pickup device. Accordingly, it is required to shade by a mechanical shutter after completing exposure to obtain one picture by one exposure like a digital still camera in order to prevent the images of the first and second fields from changing.

By the way, the charge transfer type solid-state image pickup device typified by the CCD (Charge Coupled Device) image pickup device causes smear and blooming as its unique phenomena. Here, the 'smear' is a phenomenon causing whitish stripe noises across the whole angle of field in the vertical direction when there is a highly luminous subject within an picked up image. The blooming is a phenomenon by which signal charges generated by the sensor sections (pixels) become excessive as an excessive quantity of light enters and overflow to the surrounding pixels, thus causing a white part spreading around the sensor sections.

Beside the smear and blooming components, a semiconductor device causes electric charge stored as time elapses regardless of light even in the state in which light is shut off, i.e., a dark signal (dark current), as a noise component. These noise components appear as stationary pattern noises in the picked up image and become a factor of deteriorating the image quality.

Then, an operation of sweeping out the electric charges within the vertical transfer section by transferring and driving the vertical transfer section at speed higher than the normal transfer speed after closing a mechanical shutter (hereinafter referred to as a sweep-out transfer) has been carried out to sweep the dark signal component sprung out within the vertical transfer section and the smear and blooming components leaked from the sensor sections in the prior art CCD image pickup device used as an image pickup device in a digital still camera controlling an exposure time by using the mechanical shutter. After that, the signal charges from the respective sensor sections are read out.

Although it is possible to obtain one image by one time of exposure without using the mechanical shutter in case of the total pixel reading out type solid-state image pickup device, there is a case when the similar sweep-out transfer is carried out also in the total pixel reading out type solid-state image pickup device to remove the dark signal component sprung out in the vertical transfer section and the smear and blooming components leaked from the sensor sections.

In case of the frame reading out type solid-state image pickup device, the sweep-out transfer is carried out by the same number of steps in the first and the second field sides, respectively, from the point of time when the mechanical shutter is closed and the exposure period ends till the time when the signal charge is read out from the sensor section as it is apparent from a timing chart in FIG. 7. It means that the sweep-out transfer period is equal in the first and the second field sides. That is, it also means that the quantity of handled electric charge in the sweep-out transfer of the first and the second field sides is equal.

However, a quantity of unnecessary electric charge swept out at high speed is different as follows in the first and the second field sides. That is, while the quantity of unnecessary charge swept out at high speed is the dark signal component+smear component+blooming component in the first field side because the smear and blooming components are caused by the input light and are all swept out by the sweep-out transfer in the first field side, only the dark signal component is swept out in the second field side.

Therefore, although there has been totally no problem in the sweep-out transfer in the second field side when an excessive quantity of light enters during the exposure period and when the smear and blooming components increase along that, there has been a problem in the sweep-out transfer in the first field side that the quantity of unnecessary charge to be swept out exceeds the quantity of charge to be handled in the vertical transfer section, thus causing defective sweep.

For example, there is a case of taking a picture of the sun during day time which is otherwise difficult to see directly by eyes because the digital still camera allows its user to take such picture by watching an image projected on a liquid crystal monitor without watching the sun directly by eyes through an optical finder. When such excessive quantity of light like the sun light enters, a quantity of unnecessary charge to be swept out exceeds the quantity of charge to be handled by the vertical transfer section, thus causing the defective sweep which appears as a vertical stripe in the upper part of the screen as shown in FIG. 8.

It is conceivable to take a method of increasing the quantity of handled charge by prolonging the sweep-out transfer period of the first field side to eliminate such problem. Normally, because the dark signal component<< (smear component+blooming component), it is conceivable of not carrying out the sweep-out transfer in the second field side and of allocating it to the sweep-out transfer period of the first field side when only the smear component+ blooming component are to be swept out. In this case, the sweep-out transfer period of the first field side may be doubled without increasing the total sweep-out transfer period.

However, the sweep-out transfer must be carried out also in the second field side due to the following reasons. When the sweep-out transfer period of the second field side is eliminated as shown in the timing chart in FIG. 9A, shading in which a dark signal output waveform (1) in the first field side has an inclination obliquely as shown in FIG. 9B occurs. However, a dark signal output waveform (2) of the second field side becomes constant. Thus, the dark signal output waveforms (1) and (2) are unbalanced in the first and second field sides.

Here, a case of turning on a power supply right after closing the mechanical shutter will be considered to explain it as shown in the timing chart in FIG. 9A. At first, because the sweep-out transfer for removing the smear components and others is fast, there is less storage time. Accordingly, the dark signal component generated during this sweep-out transfer period is fully smaller than the dark signal component generated in a line shift (vertical transfer of one line) period after that, so that it may be considered to be almost zero. This sweep-out transfer sweeps and removes also the dark signal component in addition to the smear and blooming components.

Then, the dark signal increases as the storage time elapses in the vertical transfer section during the next line shift period and presents the dark signal output waveform (1) as shown in FIG. 9B. No dark signal component is removed by the sweep-out transfer before reading out the signal charge from the sensor section and the dark signal A is stored before outputting the signal as shown in FIG. 9B in the next second field side, so that the dark signal output waveform (1)+A, i.e., the dark signal output waveform (2), is outputted in outputting the signal and the dark signal becomes constant.

When the sweep-out transfer is carried out also in the second field side as shown in a timing chart in FIG. 10A on the other hand, shading by which the dark signal output waveform (1) on the first field side has an inclination obliquely occurs and shading by which the dark signal output waveform (2) has an inclination obliquely occurs also in the second field side as shown in FIG. 10B because the dark signal (the dark signal component A which has been stored till then) is removed by the sweep-out transfer before reading out.

Thus, although the dark signal output waveforms (1) and (2) of the first and second field sides have the same waveform as shown in FIG. 10B when the sweep-out transfer is carried out also in the second field side, the shading by which the dark signal output waveform (1) in the first field side has the inclination obliquely occurs and the dark signal output waveform (2) in the second field side becomes constant, thus causing the unbalanced dark signal output waveforms (1) (2) in the first and second field sides as shown in FIG. 9B, when no sweep-out transfer is carried out in the second field side.

When the both fields are combined to create one frame of image, output lines of the first and second fields are disposed alternately. Then, the dark signals differ largely among the lines and the difference of the outputs of the dark signal appears as a horizontal stripe especially around the upper part of the screen (the first step of signal output). Accordingly, even such dark signal component which is fully smaller than the smear and blooming components deteriorates the image quality in such state, so that the sweep-out transfer is actually carried out also in the second field side.

Still more, the sweep-out transfer period of the second field side had to be prolonged accordingly to increase the quantity of handled charge by prolonging the sweep-out transfer period of the first field side as described above because the idea of equally setting the sweep-out transfer periods in the first and second field sides has been set as a premise in the past from such reasons that it is easy to set driving timing. Then, there has been a new problem that the period from the time when the mechanical shutter is closed till when the signal charges of all pixels are outputted is prolonged because the total sweep-out transfer period of the second field is prolonged.

The above and other advantages of the invention will become more apparent in the following description and the accompanying drawings.

SUMMARY OF THE INVENTION

The present invention has been devised in view of the problems described above and its object is to provide a method for driving solid-state image pickup devices, and an image pickup system, which allows a quantity of handled electric charge (quantity of swept-out charge) to be increased in the sweep-out transfer period of the first field side without changing the total sweep-out time.

In order to achieve the above-mentioned object, according to a first aspect of the invention, the sweep-out transfer period of the first field side is set to be longer than the sweep-out transfer period of the second field side in a solid-state image pickup device having a plurality of sensor sections which are arrayed in matrix and carry out photoelectric conversion and a vertical transfer section for transferring signal charges photoelectrically converted by those sensor sections and carrying out the sweep-out transfer of transferring and sweeping charges within the vertical transfer section before reading out the signal charges from the sensor section to the vertical transfer section.

According to a second aspect of the invention, transfer speed in the sweep-out transfer period of the second field side is set to be higher than transfer speed in the sweep-out transfer period of the first field side in the solid-state image pickup device.

According to a third aspect of the invention, an image pickup system comprises a solid-state image pickup device having a plurality of sensor sections which are arrayed in matrix and carry out photoelectric conversion and a vertical transfer section for transferring signal charges photoelectrically converted by those sensor sections; wherein the solid-state image pickup device carrying out sweep-out transfer of transferring and sweeping electric charges within the vertical transfer section before reading out the signal charges from the sensor section to the vertical transfer section; light control means for controlling light entering to the respective sensor sections of the solid-state image pickup device; and driving means for driving the solid-state image pickup device and the light control means and setting the sweep-out transfer period of the first field side carried out from when the light control means is closed till when the signal charges are read out from the sensor section to the vertical transfer section to be longer than the sweep-out transfer period of the second field side.

According to a fourth aspect of the invention, transfer speed in the sweep-out transfer period of the second field side is set to be higher than transfer speed in the sweep-out transfer period of the first field side.

According to a fifth aspect of the invention, there is provided a method for driving a solid-state image pickup device having a plurality of sensor sections which are arrayed in matrix and carry out photoelectric conversion and a vertical transfer section for transferring signal charges photoelectrically converted by those sensor sections and carrying out sweep-out transfer of transferring and sweeping charges within the vertical transfer section before reading out the signal charges from the sensor section to the vertical transfer section. The method comprises a first sweep-out transfer step of transferring and sweeping charges within the vertical transfer section after the exposure period of the sensor section; a first charge reading out and transferring step of reading out and transferring the charges in the first field from the sensor section to the vertical transfer section after the first sweep-out transfer step; a second sweep-out transfer step of transferring and sweeping the charges within the vertical transfer section after the first charge reading out and transferring step; and a second charge reading out and transferring step of reading out and transferring from the sensor section to the vertical transfer section after the second sweep and transfer step. In the method, the sweep-out transfer period of the first field side is set to be longer than the sweep-out transfer period of the second field side.

According to a sixth aspect of the invention, the method for driving the solid-state image pickup device further comprises a step of blocking light from entering to the sensor section after the exposure period in the sensor section and before the first sweep-out transfer period.

The sweep-out transfer period of the first field side is set to be longer than that of the second field side in mounting the solid-state image pickup device which carries out the sweep-out transfer before reading out the signal charges from the sensor section to the vertical transfer section in the image pickup system which controls the exposure time by using light control means, e.g., the mechanical shutter. Because the quantity of charge handled in the second field side is smaller than that in the first field side, it is preferable to allocate the period corresponding to the small quantity to the sweep-out transfer period of the first field side. It allows the quantity of electric charge to be handled in the sweep-out period of the first field side to be increased without changing the total sweep-out period.

BRIEF DESCRIPTION OF THE DRAWINGS

FIGS. 9A and 9B, explain the operation when there is no sweep-out transfer is carried out in the second field side, wherein FIG. 9A shows its timing chart and FIG. 9B shows output waveforms of dark signals, respectively; and FIGS. 10A and 10B explain the operation when there is sweep-out transfer is carried out both in the first and second field sides, wherein FIG. 10A shows its timing chart and FIG. 10B shows output waveforms of dark signals, respectively.

DESCRIPTION OF THE PREFERRED EMBODIMENTS

Preferred embodiments of the invention will be explained in detail below with reference to the appended drawings.

Figure 1:
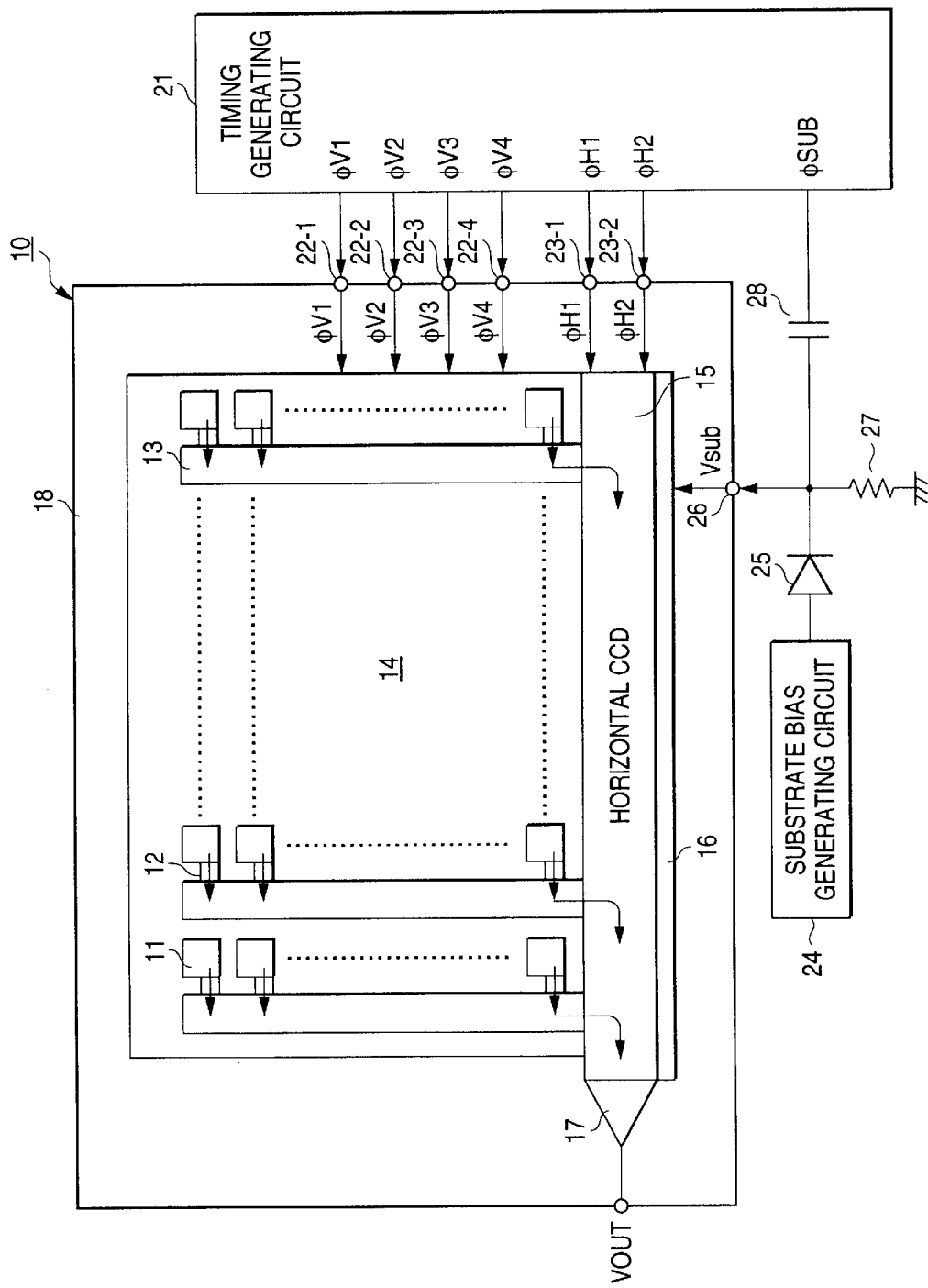
FIG. 1 is a schematic structural view showing one example of an interlace scanning type CCD solid-state image pickup device of the present invention.

FIG. 1 is a schematic structural view showing one example of an interlace scanning type CCD image pickup device to which an inventive driving method is applied.

In FIG. 1, an image pickup area 14 comprises a plurality of sensor sections (pixels) 11 which are arrayed in matrix and store input light by converting into signal charge of a quantity of electric charge corresponding to its quantity of light and a plurality of vertical CCDs (vertical transfer section) 13 which are disposed per each vertical column of the sensor sections 11 to vertically transfer the signal charges read out from the respective sensor sections 11 via a reading out gate section 12.

In the image pickup area 14, the sensor section 11 is composed of a PN junction photodiode for example. The signal charge stored in the sensor section 11 is read out to the vertical CCD 13 as a reading out pulse XSG described later is applied to a gate electrode of the reading out gate section 12 and potential under the gate electrode is deepened. The vertical CCD 13 transfers the signal charge which has been read out by being transferred and driven by four phases of vertical transfer clocks $\phi V1$ through $\phi V4$ for example sequentially in the vertical direction per part which corresponds to one scan line (one line) in a part of horizontal blanking period.

In the vertical CCD 13, the first and third phase transfer electrodes function also as the gate electrode of the reading out gate section 12. From this fact, the first phase vertical transfer clock $\phi V1$ and the third phase vertical transfer clock $\phi V3$ among the four phases of vertical transfer clocks $\phi V1$ through $\phi V4$ are set so as to take three values of low, intermediate and high levels and the third value high level pulse becomes the reading out pulse XSG which is applied to the gate electrode of the reading out gate section 12.

A horizontal CCD 15 is disposed at the lower part of the image pickup area 14 in the figure. The signal charge corresponding to one line is transferred sequentially from the plurality of vertical CCDS 13 to the horizontal CCD 15. The horizontal CCD 15 transfers the signal charge of one line transferred and driven by the two phases of horizontal transfer clocks $\phi H1$ and $\phi H2$ and transferred from the plurality of vertical CCDs 13 sequentially in the horizontal direction in a horizontal scan period after the horizontal blanking period. An overflow drain 16 is disposed adjacent to the horizontal CCD 15 along the transfer direction. Electric charges overflown in the horizontal CCD 15 are swept out to the overflow drain 16.

A charge-voltage converting section 17 composed of a floating diffusion amplifier for example is providedat the edge of the horizontal CCD 15 to which the charges are transferred. The charge-voltage converting section 17 converts, and outputs, the signal charges which have been transferred horizontally by the horizontal CCD 15 sequentially into signal voltage. This signal voltage is led out as CCD output VOUT corresponding to the quantity of light of the image light (input light) from a subject after going through an output circuit not shown.

The sensor sections 11, the reading out gate sections 12, the vertical CCD 13, the horizontal CCD 15 and the charge-voltage converting section 17 described above are formed on a semiconductor substrate (hereinafter referred to simply as a substrate) 18. The interlace scanning type CCD solid-state image pickup device 10 is constructed as described above. A timing generating circuit 21 generates the four phases of vertical transfer clocks $\phi V1$ through $\phi V4$ and the two phases of horizontal transfer clocks $\phi H1$ and $\phi H2$ for driving the CCD solid-state image pickup device 10.

The four phases of vertical transfer clocks φV1 through φV4 are supplied to the vertical CCDs 13 via terminals (pads) 22-1 through 22-4 formed on the substrate 18. The two phase of horizontal transfer clocks φH1 and φH2 are supplied to the horizontal CCD 15 via terminals 23-1 and 23-2. Beside the four phases of vertical transfer clocks φV1 through φV4 and the two phases of horizontal transfer clocks φH1 and φH2, the timing generating circuit 21 generates various timing signals such as a shutter pulse φSUB for sweeping out the signal charges stored in the sensor sections 11 to the substrate 18.

Meanwhile, substrate bias voltage Vsub generated by a substrate bias generating circuit 24 is applied to the substrate 18 via a clamping diode 25 and a terminal 26. The substrate bias generating circuit 24 and peripheral circuit devices may be disposed within the substrate 18. A resistor 27 is connected between the terminal 26 and the ground. Then, the DC component of the shutter pulse φSUB generated by the timing generating circuit 21 is cut by a capacitor 28 and then the pulse is superimposed with the substrate bias voltage Vsub to be applied to the substrate 18 via the terminal 26.

Figure 2:
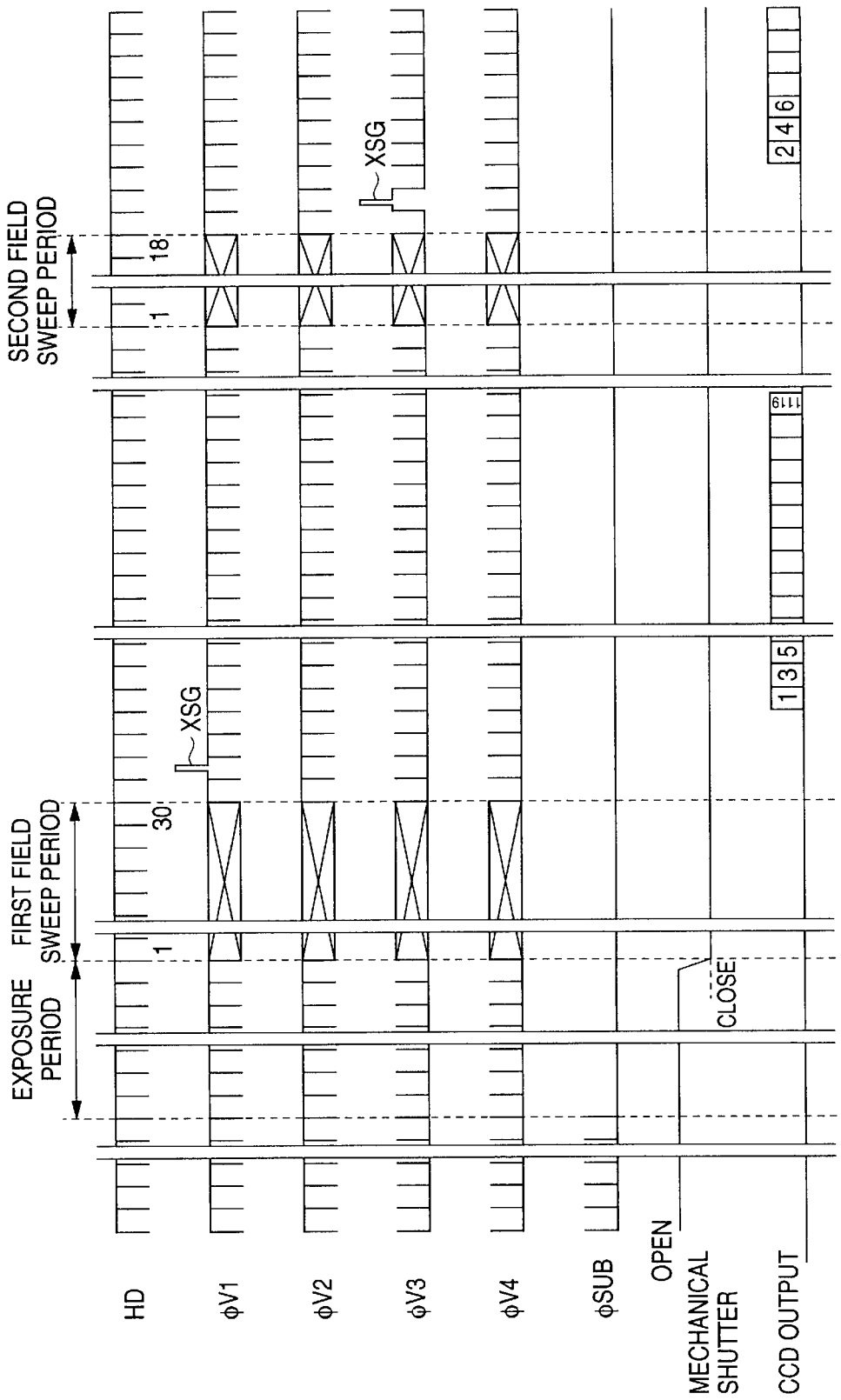
FIG. 2 is a timing chart of a driving method according to a first embodiment of the invention.

It is noted that the timing generating circuit 21 generates clock having a frequency higher than a frequency in normal transfer in transferring the read out signal charges as the four phases of vertical transfer clocks φV1 through φV4 before reading out the signal charges from the sensor sections 11 by generating the reading out pulse XSG as it is apparent from a timing chart in FIG. 2. Thereby, the sweep-out transfer is carried out in the CCD solid-state image pickup device 10 at speed higher than the transfer speed in the normal transfer of transferring the read out signal charges before reading out the signal charges.

This sweep-out transfer is an operation which is carried out to sweep out dark signal components which have sprung out in the vertical CCD 13 and smear and blooming components leaked from the sensor sections 11 before reading out the signal charges from the sensor sections 11. Unnecessary charges are swept out by this sweep-out transfer by sending the dark signal components and the smear and blooming components (electric charges) within the vertical CCD 13 to the horizontal CCD 15 by the high-speed vertical transfer, by sweeping out the charges overflown out of the horizontal CCD 15 to the overflow drain 16 and by sweeping out the charges remaining within the horizontal CCD 15 to the charge-voltage converting section 17 by horizontally transferring through the horizontal CCD 15.

In the interlace scanning type CCD solid-state image pickup device 10 constructed as described above, a pixel structure will be explained by exemplifying a case in which a number of pixels within the vertical direction is 1200 lines (pixels), a number of pixels in the horizontal direction is 1600 bits (pixels), 1H (H is horizontal scan period) is 1800 bits (pixels) and the transfer speed in the sweep-out transfer period is 56 bits/line.

Figure 7:
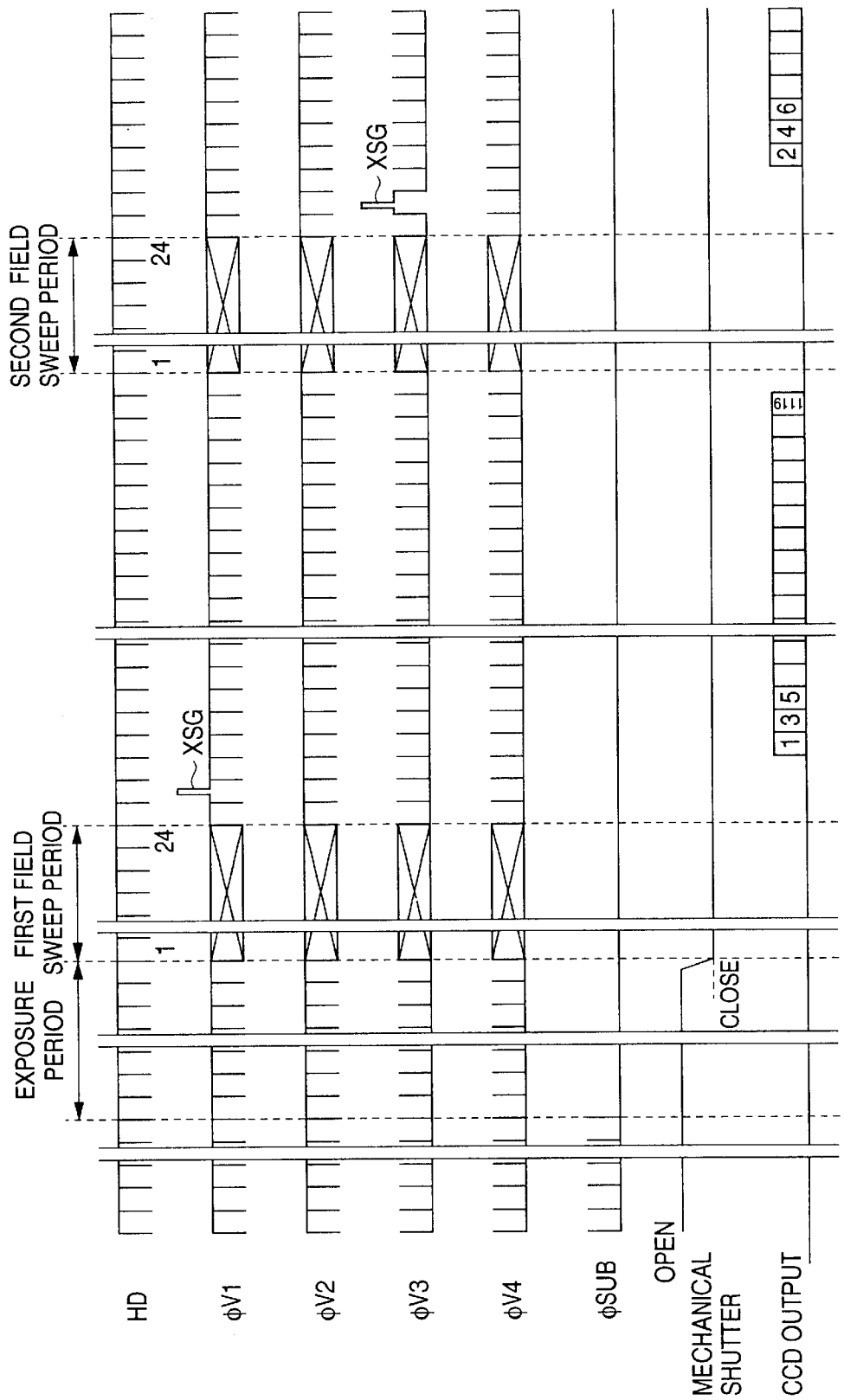
FIG. 7 is a timing chart of a prior art driving method.
Figure 8:
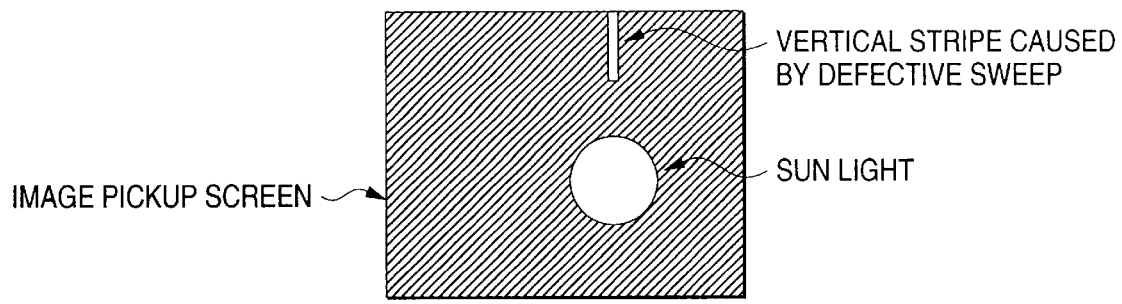
FIG. 8 shows a screen causing a vertical stripe due to defective sweep in taking a picture of the sun light.
Figure 9A:
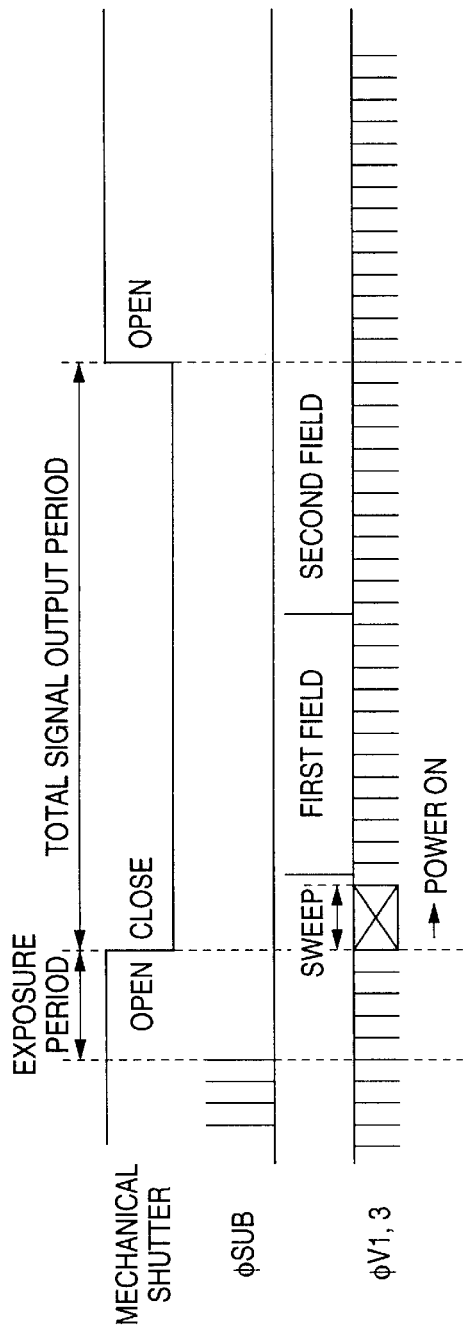
Figure 9B:
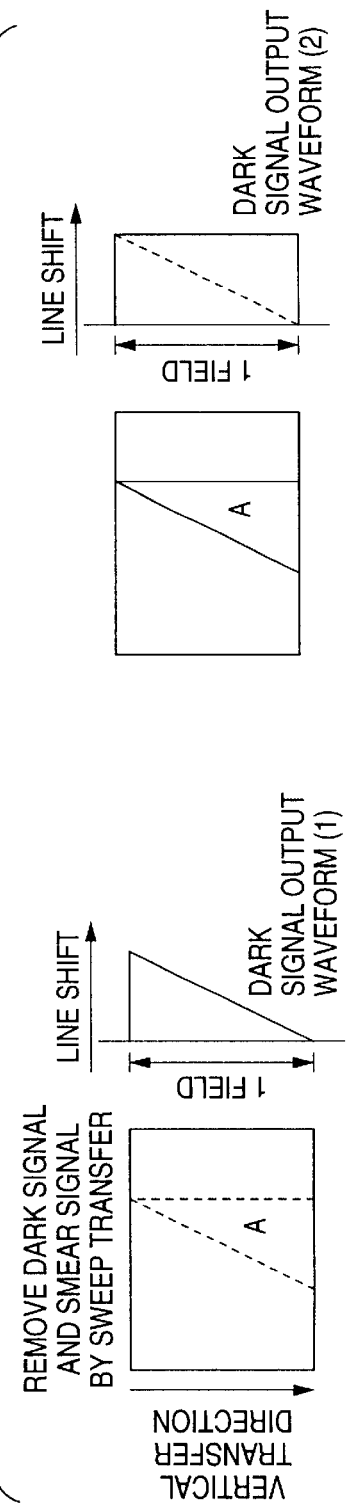
Figure 10A:
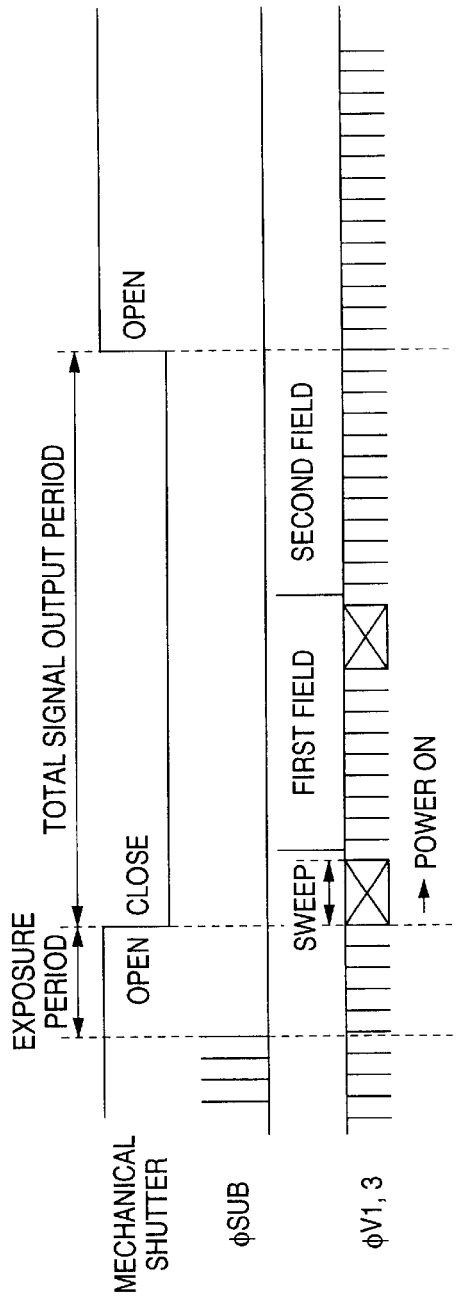
Figure 10B:
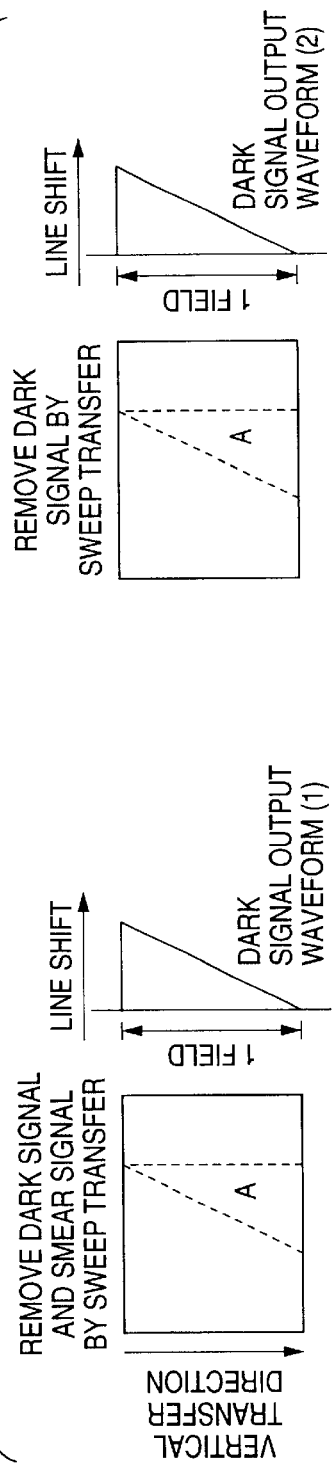

When a sweep-out transfer of sweeping a number of steps of 1.3 times is to be carried out by taking a margin of number of pixels in the vertical direction in the pixel structure described above, the sweep-out transfer period of the first and second fields turns out as follows and a sweep-out transfer period of 24 H period has been set for the both first and the second field sides in case of the prior art driving method as shown in a timing chart in FIG. 7:

$$1200*1.3/(1800/56)/2=23.4$$

Meanwhile, while the dark signal+smear+blooming components must be swept out as the unnecessary charge in the first field side, only the dark signal component needs to be swept out as unnecessary charge in the second field side, i.e., only those in the vertical CCDs 13 of this number of steps need to be swept out when the number of pixels in the vertical direction is 1200 lines, so that a sweep-out transfer period of 18H period may be set as follows;

$$1200/(1800/56)/2=18.7$$

In view of this fact, according to the driving method of the first embodiment of the invention, the sweep-out transfer period of 24.3H−18.7H=5.6 H of the second field side is allocated to the sweep-out transfer period of the first field side so as to set the sweep-out transfer period of the first field side at about 30H (=24.3 H+5.6 H) and the sweep-out transfer period of the second field side at 18H as it is apparent from the timing chart in FIG. 2.

Figure 3:
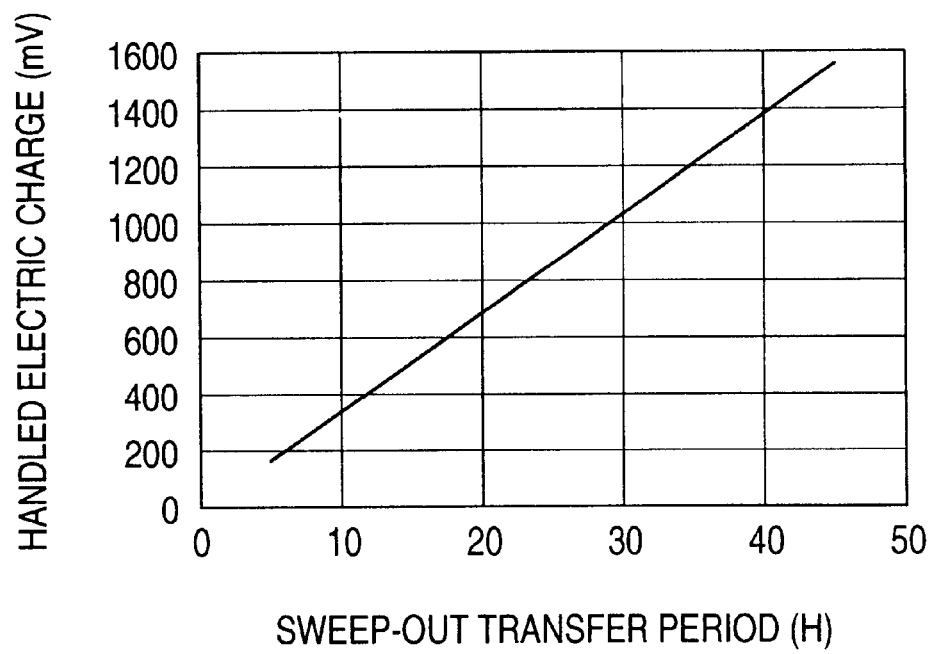
FIG. 3 is a graph showing the correlation between a high-speed sweep-out period and a quantity of charge handled in high-speed sweep-out operation.

Thereby, the sweep-out transfer of the dark signal component+smear component+blooming component of about 1050 mV which is greater by about 200 mV as compared to that of the prior art driving method (24 H about 850 mV) may be carried out in the first field side as it is apparent from FIG. 3 in the total sweep-out transfer period (48 H) of the first and second fields. It is noted that FIG. 3 shows the correlation between the sweep-out transfer period and the quantity of handled charge in the sweep-out transfer.

It is also noted that although the sweep-out transfer period of the first field side has been set to be longer than the sweep-out transfer period of the second field side without changing the time (48 H in this case) determined in advance as the total sweep-out transfer period of the first and second field sides in the first embodiment described above, it is possible to keep the sweep-out transfer period of the second field side as 24 H and to change only the sweep-out transfer period of the first field side to set at 30 H.

In case of this driving method, although the total sweep-out transfer period of the first and second field sides becomes 54 H (30 H+24 H) and the time from the start of the sweep-out transfer of the first field to reading out the signal charges of all pixels (till the reading out pulse XSG of the second field rises) is prolonged by 6 H as compared to the case of the driving method of the first embodiment, the time may be shortened by 6 H as compared to a case of setting the sweep-out transfer period at 30 H period both in the first and second field sides.

By the way, the transfer speed must be set at a certain constant value in order to assure the quantity of handled charge in the sweep-out transfer of the first field side. However, it poses no problem in the second field side because only the dark signal component needs to be swept out and there is less quantity of unnecessary charge as described before even when the quantity of handled charge reduces by setting the transfer speed of the sweep-out transfer period at higher speed.

Figure 4:
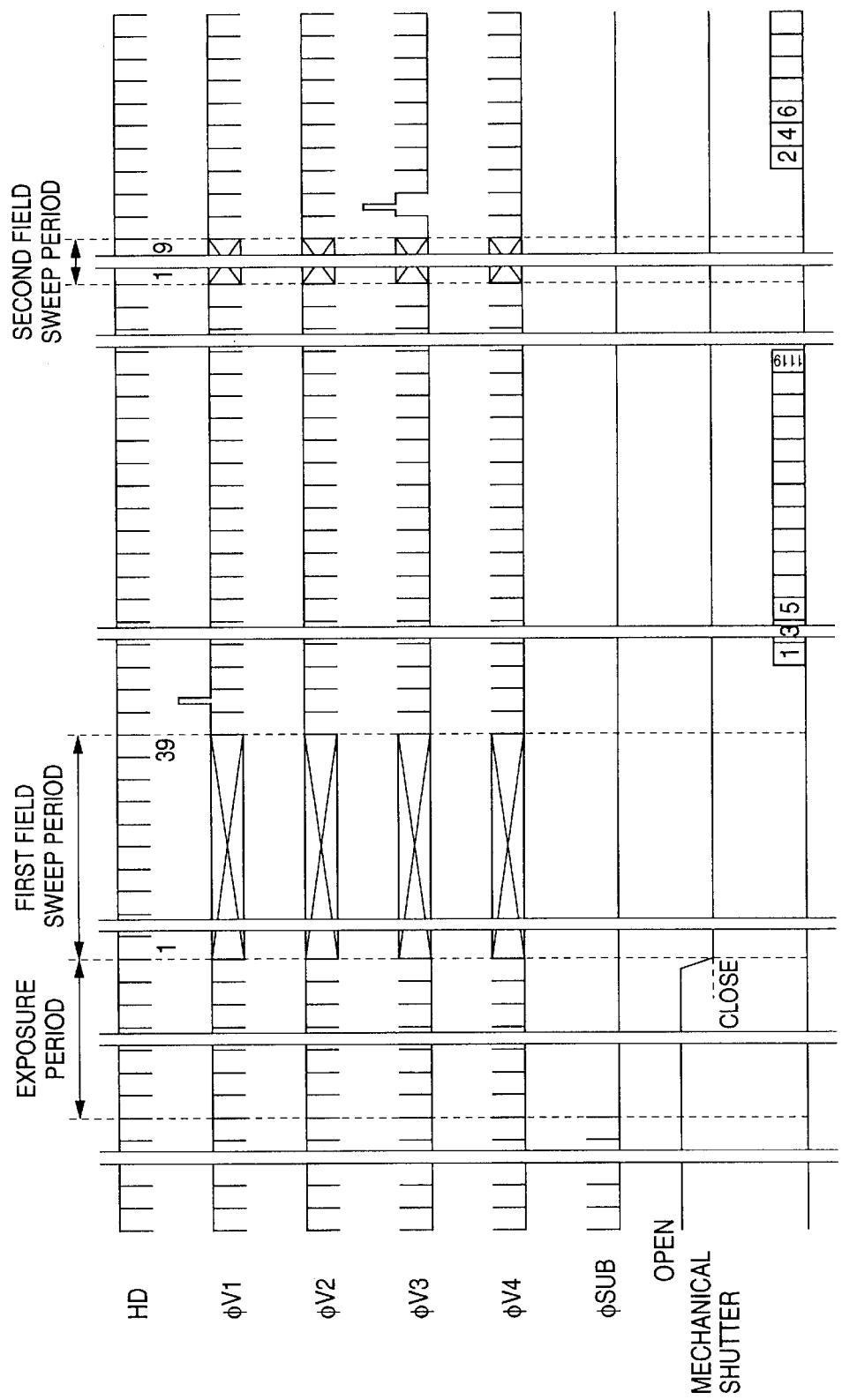
FIG. 4 is a timing chart of a driving method according to a second embodiment of the invention.

Then, according to a driving method of a second embodiment of the invention, the transfer speed in the sweep-out transfer period of the second field side is set at twice of the past, i.e., 28 (=56/2) bits/line for example as shown in a timing chart of FIG. 4. As for a number of transfer steps, the sweep-out transfer period of the least number of vertical pixels is set at;

$$1200/(1800/28)/2=9.3$$

Thereby, the sweep-out transfer period of the second field side may be cut by 15.0 (=24.3−9.3) H as compared to the prior art driving method and by 9.4 (=18.7−9.3) H as compared to the driving method of the first embodiment.

Then, this cut is allocated to the sweep-out transfer period of the first field side. As a result, the sweep-out transfer period of the first field side turns out as follows;

$$39.3\ H = 24.3 + (24.3 - 9.3)$$
$$= 29.9 + (18.7 - 9.3)$$

Thereby, while the number of transfer steps of the sweep-out transfer period of the first field side is about 1.3 times of the number of vertical pixels in the prior art driving method (FIG. 7) and is about 1.6 times of the number of vertical pixels in the driving method of the first embodiment (FIG. 2), it is about 2.1 times of the number of vertical pixels in the driving method of the present embodiment (FIG. 4). That is, in case of the driving method of the present embodiment, it is possible to carry out the sweep-out transfer of about 2.1 times of the number of steps of the number of vertical pixels in the sweep-out transfer of the first field side.

Here, it will be explained that how much of the quantity of light the device can sustain with respect to the standard setting when the driving methods of the first and second embodiments are used.

As for the ratio of the components of the unnecessary charge in the first field side, i.e., the dark signal component, smear component and blooming component, only the smear component is proportional to a quantity of light when the quantity of input light is fully large, so that they are considered to have the following relationship;

dark signal component<< blooming component<< smear component

That is, the smear component is dominant when the quantity of input light is fully large.

For instance, when it is assumed that the smear actual power of this CCD image pickup device is −100 dB and the standard setting is 150 mV, a quantity of handled charge when the sweep-out transfer period of the first field side is 24.3 H (in the driving method of the prior art) is 845 mV, a quantity of handled charge when the period is 29.9 H (in the driving method of the first embodiment) is 1039 mV and a quantity of handled charge when the period is 39.3 H (in the driving method of the second embodiment) is 1366 mV as it is apparent from FIG. 3. Accordingly, the quantity of handled charge/smear component is 56333 multiple quantity of light (=845 mV/150 mV×10×0.00001) in case of the prior art driving method, is 69267 multiple quantity of light (=1039 mV/150 mV×10×0.00001) in case of the driving method of the first embodiment and is 91067 multiple quantity of light(=1366 mV/150 mV×10×0.00001) in case of the driving method of the second embodiment. It can be seen from the above facts that the driving method of the second embodiment allows to sustain to the quantity of light of about 1.6 times as compared to the prior art driving method.

It is noted that although the transfer speed of the sweep-out transfer period of the second field side has been set at twice of the transfer speed of the sweep-out transfer period of the first field side in the second embodiment described above, the invention is not limited to that and allows to set at an arbitrary multiple of more or less than twice beside integer times.

Figure 5:
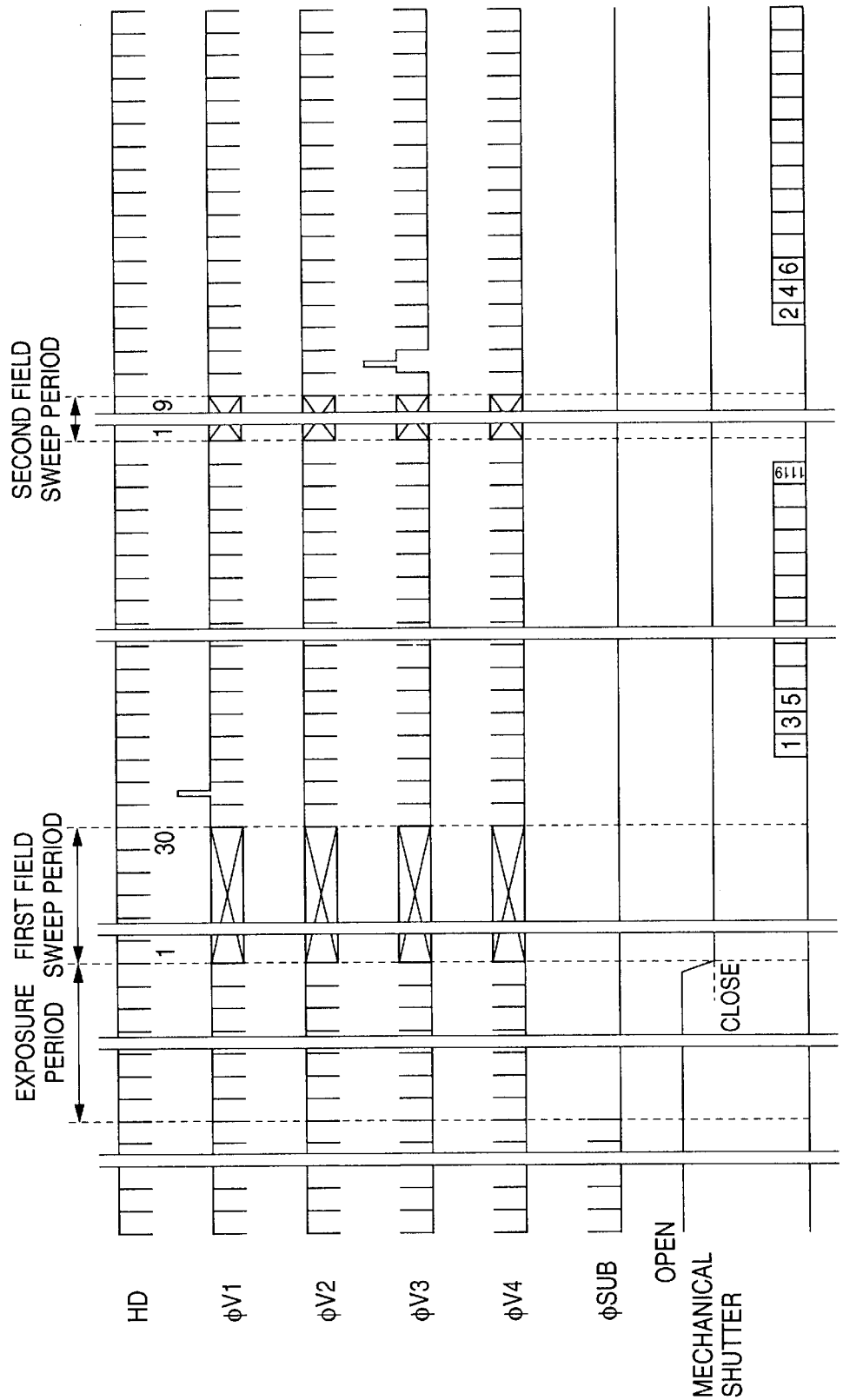
FIG. 5 is a timing chart of a driving method according to an exemplary application of the second embodiment of the invention.

FIG. 5 is a timing chart of a driving method according to an exemplary application of the second embodiment. According to the driving method of this exemplary application, the transfer speed of the sweep-out transfer period of the second field side is set at speed higher than the transfer speed of the sweep-out transfer period of the first field side and the cut of the sweep-out transfer period of the second field is used for the reduction of the total sweep-out transfer period of the first and second fields without allocating it to the sweep-out transfer period of the first field side.

That is, while the sweep-out transfer period of the first field side is set to be longer than the sweep-out transfer period of the second field side in the driving method of the first embodiment, the sweep-out transfer period of the second field side is cut simply by about 9 ($\cong 18.7 - 9.3$) H by setting the transfer speed of the sweep-out transfer period of the second field side at twice of the prior art method in the second embodiment.

Thereby, the total sweep-out transfer period of the first and second fields may be shortened by the cut (9 H) of the sweep-out transfer period of the second field side as compared to the driving method of the first embodiment, so that the period for outputting the whole quantity of signals may be shortened, i.e., the frame rate may be improved, while keeping the sweeping ability of the first field side in the driving method of the first embodiment. As a result, the time for taking one picture may be shortened.

Figure 6:
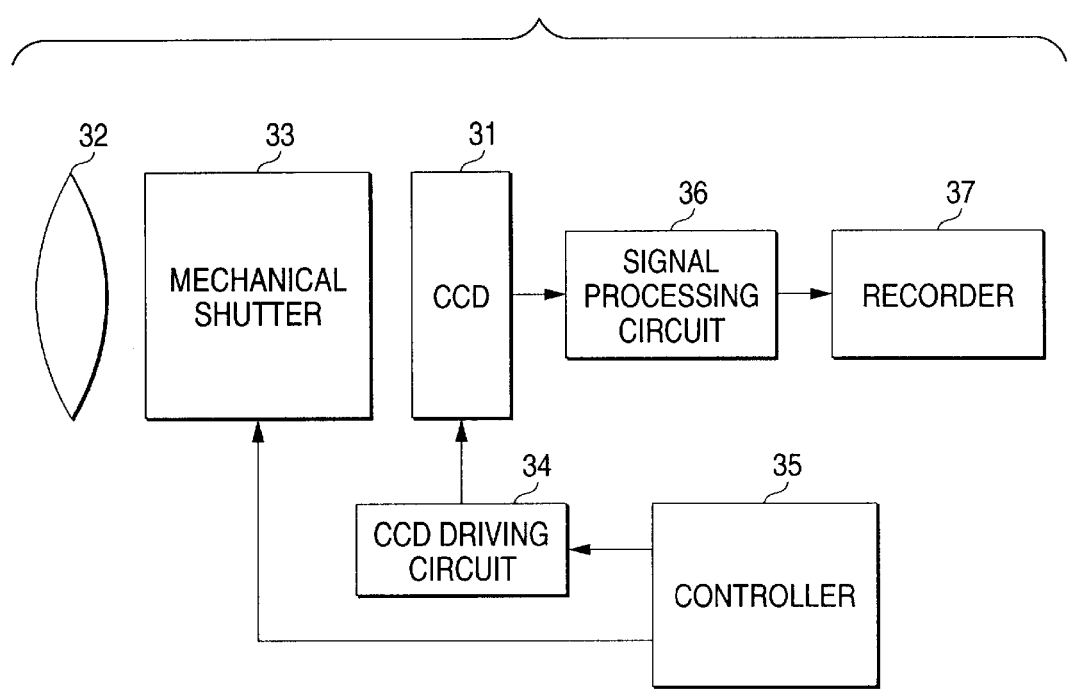
FIG. 6 is a block diagram showing an exemplary structure of an inventive digital still camera.

FIG. 6 is a block diagram showing an exemplary structure of a digital still camera (electronic still camera) which is the inventive image pickup system. The digital still camera carries the CCD image pickup device constructed as described above as an image pickup device 31 and uses the driving method of the first embodiment or the second embodiment or of the exemplary application thereof described above.

In FIG. 6, image light from a subject not shown enters an image pickup area of the CCD image pickup device 31 via a lens 32 and light control means such as a mechanical shutter 33. Here, the lens 32 images the image light from the subject to the image pickup plane of the CCD image pickup device 31 via the mechanical shutter 33. The mechanical shutter 33 controls an exposure time of the CCD image pickup device 31.

The CCD solid-state image pickup device 10 shown in FIG. 1 is used as the CCD image pickup device 31 and the driving method of the first embodiment or the second embodiment or of the exemplary application thereof described above is used as its driving method. That is, the sweep-out transfer period carried out from when the mechanical shutter 33 is closed till when the signal charges of the first field is read out from the sensor section 11 to the vertical CCD 13 is set to be longer than the sweep-out transfer period carried out until when the signal charges of the second field are read out from the sensor section 11 to the vertical CCD 13.

The CCD image pickup device 31 is driven by a CCD driving circuit 34. The CCD driving circuit 34 comprises the timing generating circuit 21 in FIG. 1 and realizes the above-mentioned driving method by appropriately controlling the timing of various timing signals generated by the timing generating circuit 21. A controller 35 composed of a CPU and others controls opening/closing of the mechanical shutter 33 and timing of the CCD driving circuit 34.

An output signal of the CCD image pickup device 31 undergoes various signal processing such as CDS (correlation double sampling) in a signal processing circuit 36 and is then recorded to a recording medium such as a magnetic disk by a recorder unit 37. It is noted that although the mechanical shutter 33 has been used to control the light entering/blocking to the image pickup plane of the CCD solid-state image pickup device 10 in the present embodiment, the invention is not limited to that and allows other light control means such as a liquid crystal shutter to be used.

Thus, the quantity of handled charge (quantity of swept charge) in the sweep-out transfer period of the first field side may be increased in the digital still camera constructed so as to carry the CCD image pickup device 31 which permits the sweep-out transfer as the image pickup device and to control the exposure time of the CCD image pickup device 31 by using the mechanical shutter 33 by setting the sweep-out transfer period carried out from when the mechanical shutter 33 is closed till when the signal charges of the first field of the CCD image pickup device 31 are read out to be longer than the sweep-out transfer period carried out until when the signal charges of the second field are read out.

Thereby, the smear+blooming components may be swept out reliably together with the dark signal component in the sweep-out transfer period of the first field side even when strong light enters during the exposure period and the smear and blooming components increase, so that the quality of the still image may be improved. In particular, the predetermined object may be achieved without changing the total sweep-out time by allocating the time corresponding to the extra quantity of handled charge of the second field side to the sweep-out transfer period of the first field side.

Still more, the sweep-out transfer period of the second field side may be cut further and the cut may be allocated to the sweep-out transfer period of the first field side by adopting the driving method of setting the transfer speed of the sweep-out transfer period of the second field side to be higher than the transfer speed of the sweep-out transfer period of the first field side, so that the quantity of handled charge in the sweep-out transfer period of the first field side may be increased further. Accordingly, it is possible to sweep the unnecessary charge caused by the quantity of input light in taking a picture of the sun during day time for example reliably without causing defective sweep in the sweep-out transfer of the first field side.

Meanwhile, the frame rate may be improved by adopting the driving method of cutting the total sweep-out transfer period of the first and second fields by the cut by setting the transfer speed of the sweep-out transfer period of the second field side to be higher than the transfer speed of the sweep-out transfer period of the first field side and by cutting the sweep-out transfer period of the second field side further, so that the time for taking one picture may be shortened. Because it allows the recording time and shooting intervals to be shortened, a number of pictures continuously taken may be increased.

As described above, the invention allows the smear and blooming components to be swept out reliably together with the dark signal component in the sweep-out transfer period of the first field side without causing defective sweep even when strong light enters during the exposure period and the smear and blooming components increase in the image pickup system using the solid-state image pickup device which carries out the sweep-out transfer before reading out the signal charges from the sensor section as the image pickup device because the quantity of handled charge in the sweep-out transfer period of the first field side may be increased by setting the sweep-out transfer period of the first field side to be longer than that of the second field side.

While the preferred embodiments have been described, variations thereto will occur to those skilled in the art within the scope of the present inventive concepts which are delineated by the following claims.

What is claimed is:

1. A method for driving a solid-state image pickup device having a plurality of sensor sections which are arrayed in matrix and carry out photoelectric conversion and a vertical transfer section for transferring signal charges photoelectrically converted by those sensor sections and carrying out sweep-out transfer of transferring and sweeping charges within said vertical transfer section before reading out the signal charges from said sensor section to said vertical transfer section, wherein a sweep-out transfer period of the first field side is set to be longer than a sweep-out transfer period of the second field side.

2. The method for driving the solid-state image pickup device according to claim 1, wherein transfer speed in the sweep-out transfer period of the second field side is set to be higher than transfer speed in the sweep-out transfer period of the first field side.

3. An image pickup system, comprising:
a solid-state image pickup device having a plurality of sensor sections which are arrayed in matrix and carry out photoelectric conversion and a vertical transfer section for transferring signal charges photoelectrically converted by those sensor sections;
wherein said solid-state image pickup device carrying out sweep-out transfer of transferring and sweeping charges within said vertical transfer section before reading out the signal charges from said sensor section to said vertical transfer section;
light control means for controlling light entering to the respective sensor sections of said solid-state image pickup device; and
driving means for driving said solid-state image pickup device and said light control means and setting the sweep-out transfer period of the first field side carried out from when said light control means is closed till when the signal charges are read out from said sensor section to said vertical transfer section to be longer than the sweep-out transfer period of the second field side.

4. The image pickup system according to claim 3, wherein transfer speed in the sweep-out transfer period of the second field side is set to be higher than transfer speed in the sweep-out transfer period of the first field side.

5. A method for driving a solid-state image pickup device having a plurality of sensor sections which are arrayed in matrix and carry out photoelectric conversion and a vertical transfer section for transferring signal charges photoelectrically converted by those sensor sections and carrying out sweep-out transfer of transferring and sweeping charges within said vertical transfer section before reading out the signal charges from said sensor section to said vertical transfer section,
said method comprising:
a first sweep-out transfer step of transferring and sweeping charges within the vertical transfer section after the exposure period of the sensor section;
a first charge reading out and transferring step of reading out and transferring the charges in the first field from said sensor section to said vertical transfer section after the first sweep-out transfer step;
a second sweep-out transfer step of transferring and sweeping the charges within said vertical transfer section after said first charge reading out and transferring step; and
a second charge reading out and transferring step of reading out and transferring the charge in the second field from said sensor section to said vertical transfer section after said second sweep and transfer step, wherein the sweep-out transfer period of the first sweep-out transfer step is set to be longer than the sweep-out transfer period of the second sweep-out transfer step.

6. The method for driving the solid-state image pickup device according to claim 5, further comprising a step of blocking light from entering to said sensor section after the exposure period in said sensor section and before said first sweep-out transfer step.

* * * * *